Oct. 25, 1932.                W. LA HODNY                1,884,759
                      COMBINED MIRROR AND INSTRUMENT
                        Filed Aug. 30, 1930        4 Sheets-Sheet 1
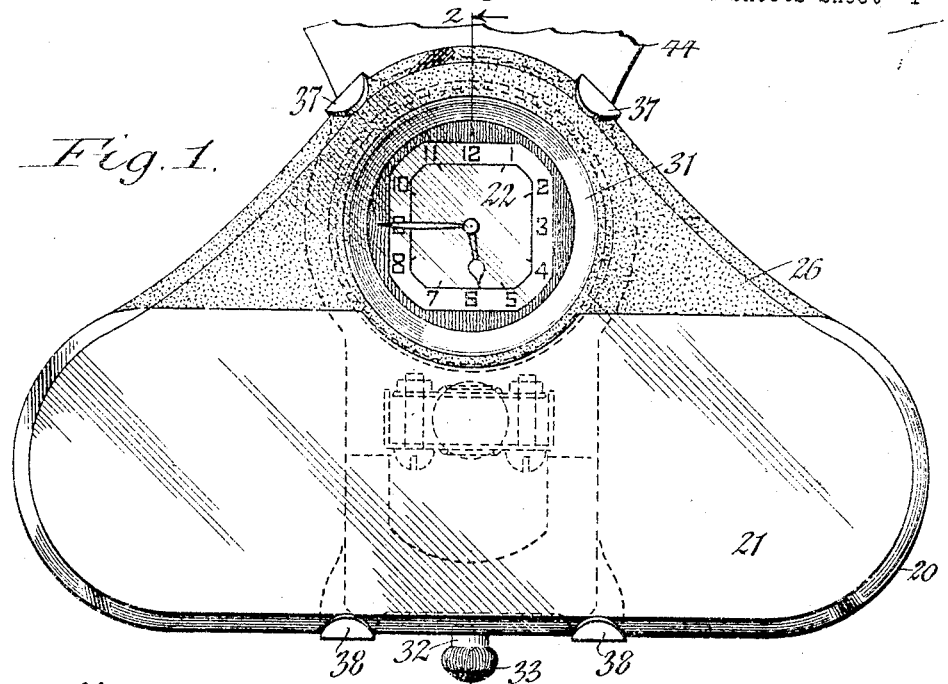
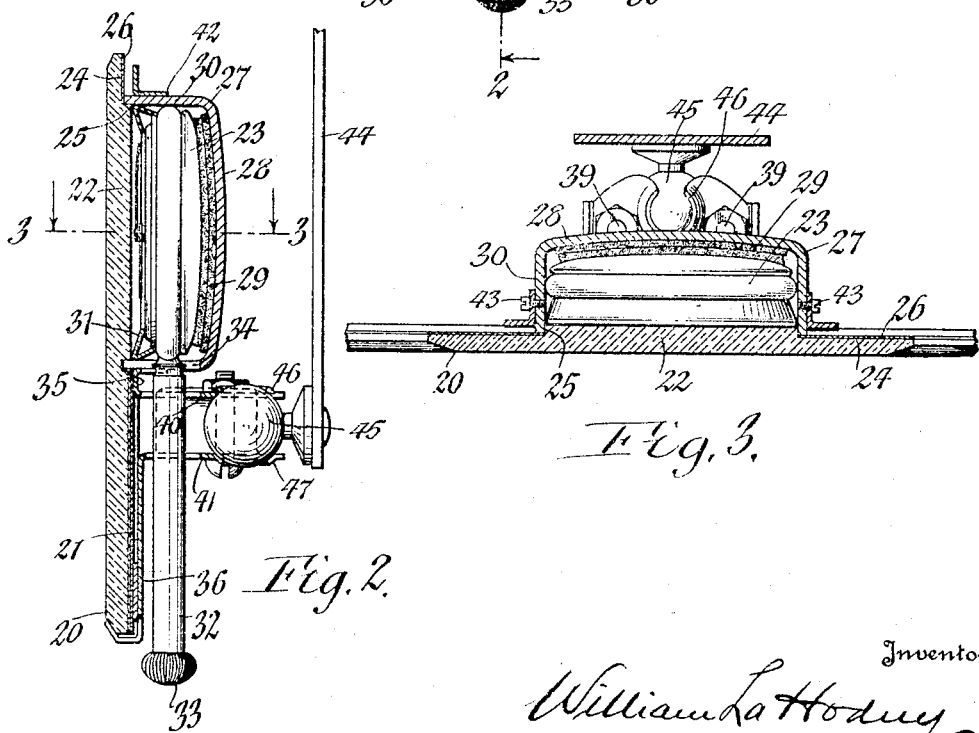
Inventor
William La Hodny
By Popp & Powers
Attorneys

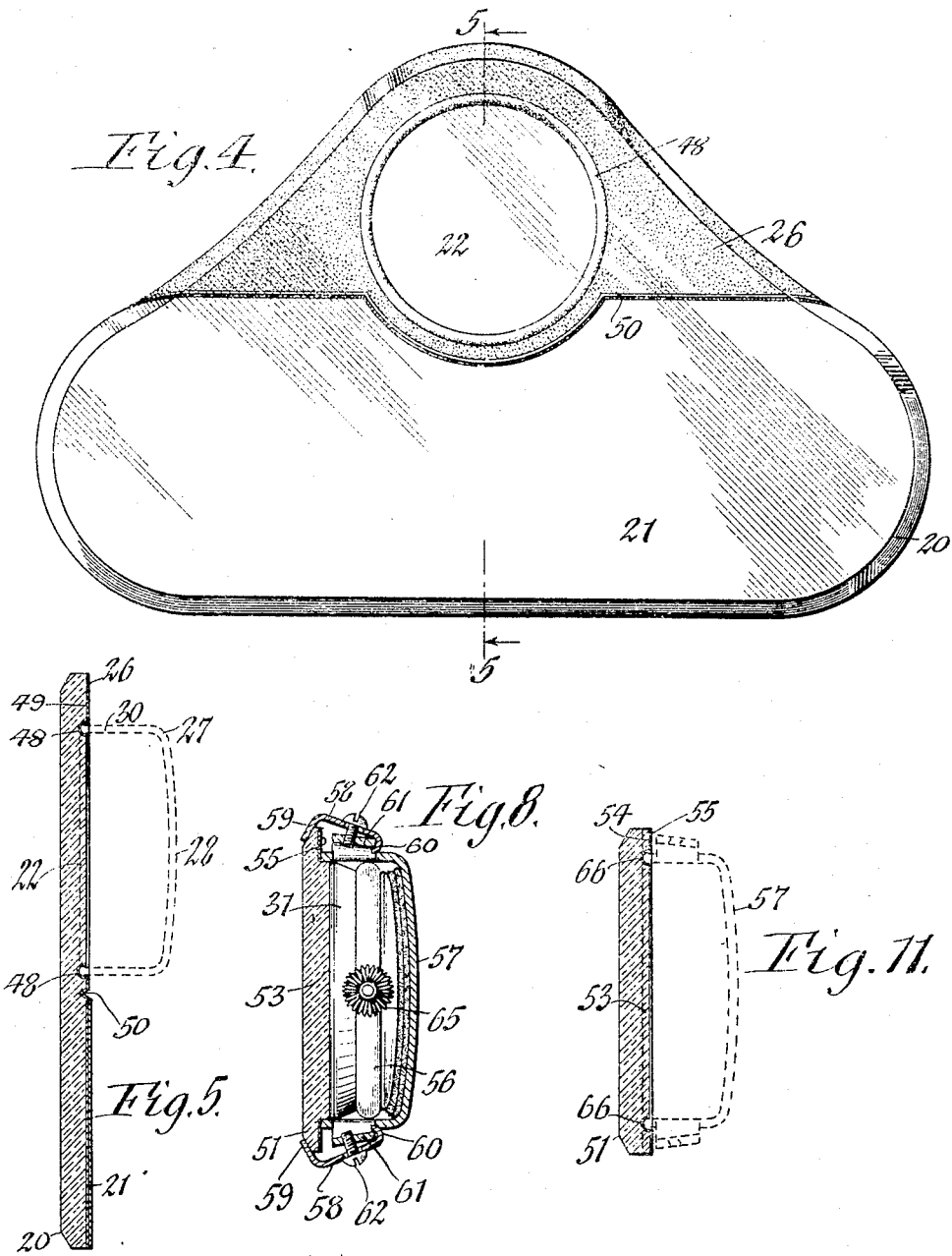

Oct. 25, 1932.  W. LA HODNY  1,884,759
COMBINED MIRROR AND INSTRUMENT
Filed Aug. 30, 1930   4 Sheets-Sheet 3
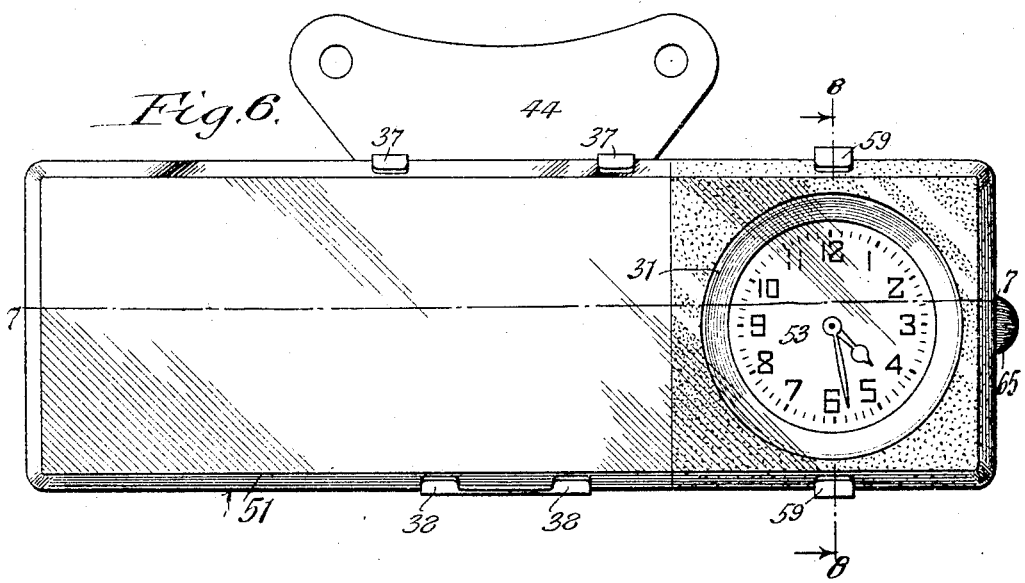
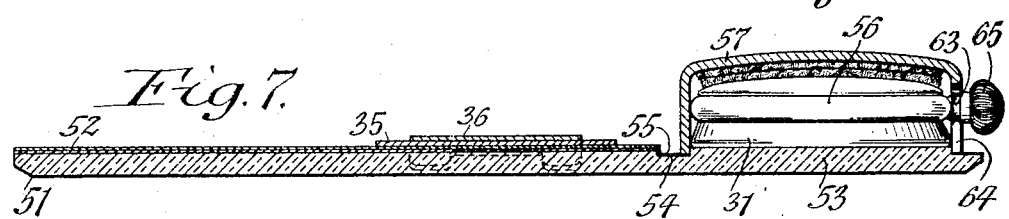
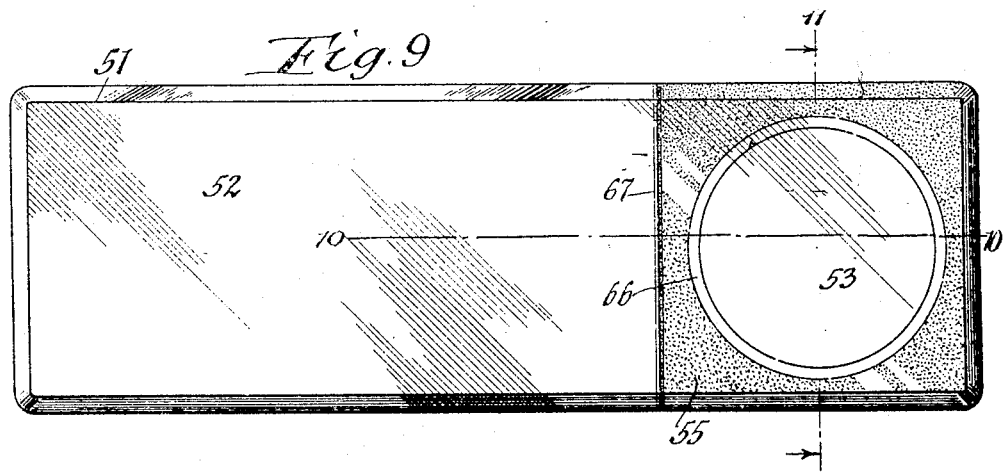
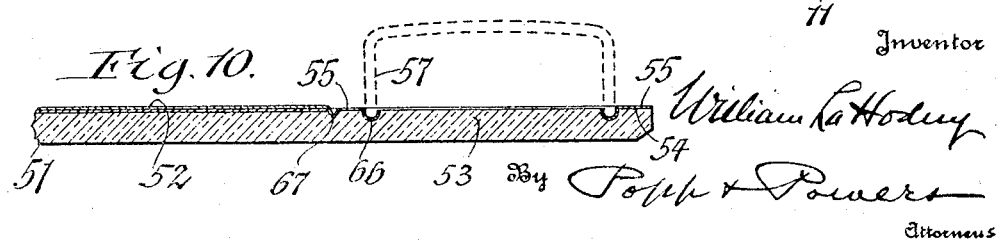

Oct. 25, 1932.  W. LA HODNY  1,884,759
COMBINED MIRROR AND INSTRUMENT
Filed Aug. 30, 1930  4 Sheets-Sheet 4
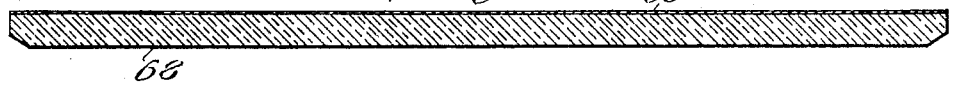
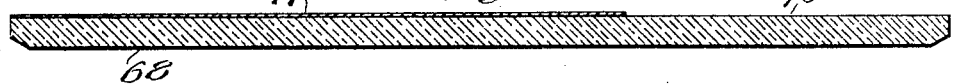
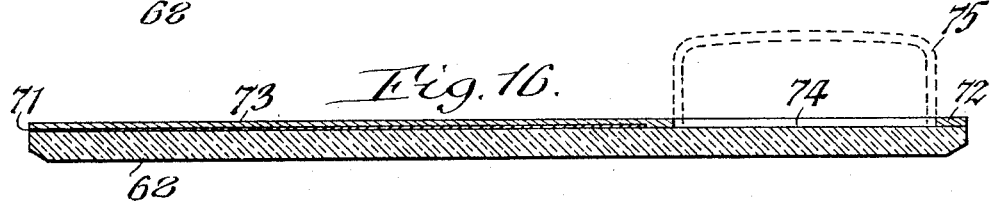
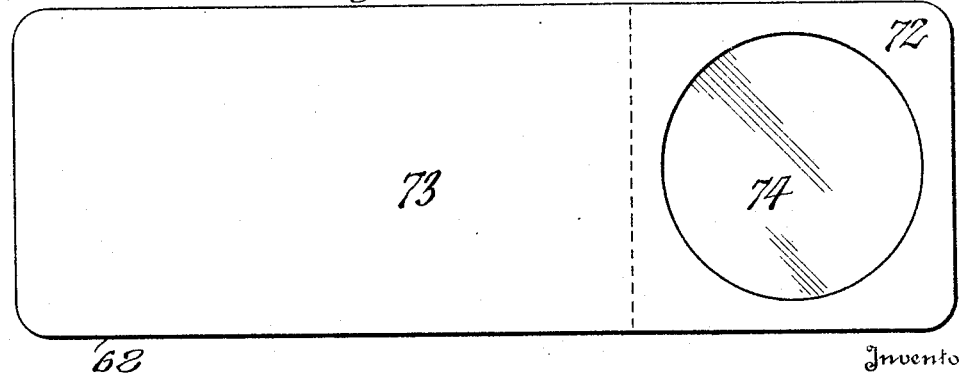

Patented Oct. 25, 1932

1,884,759

UNITED STATES PATENT OFFICE

WILLIAM LA HODNY, OF BUFFALO, NEW YORK, ASSIGNOR TO STANDARD MIRROR COMPANY, INC., OF BUFFALO, NEW YORK, A CORPORATION OF NEW YORK

COMBINED MIRROR AND INSTRUMENT

Application filed August 30, 1930. Serial No. 478,996.

This invention relates to a combined mirror and instrument and more particularly to a mirror which is intended to give a rear view of the roadway behind the car from a point on the windshield of the same, and a time piece such as a watch or clock associated with this mirror, so that the driver of the car need only glance in one direction in order to observe the road conditions in rear of the car and also ascertain the time of the day. The invention, however, contemplates the use of other instruments in connection with such a mirror which are now commonly used on an automobile and are referred to from time to time by the driver such as a compass, a barometer, a thermometer, an oil viscosity gage, or an instrument of any other character which the driver may wish to observe occasionally for ascertaining some specific information.

In mirrors of this character as heretofore constructed the entire rear surface of the glass mirror plate was usually covered with a reflecting material and the instrument such as a clock or watch mounted on the rear of this plate was visible from the front side thereof through a clear portion of the glass plate, which construction, however, is objectionable inasmuch as reading of the dial of the time piece was confusing due to the reflection of that portion of the mirror which surrounded the time piece.

It is therefore the object of this invention to provide a combined mirror and instrument in which the instrument is mounted on the rear side of the glass plate and is visible from the front side thereof but only a part of the glass plate remote from the instrument is provided with a mirror coating while the area of the glass plate immediately adjacent to the instrument and surrounding the same is made of a non-reflecting material and preferably totally different from that of the mirror, thereby producing a contrast between these fields or areas which enables the observer to readily view either the mirror portion or the instrument portion of the glass plate and to make his observation without any confusion in the vision.

In the accompanying drawings:

Figure 1 is a front elevation showing my invention embodied in a rear view mirror which is of substantially triangular form and provided in its upper part with a time piece.

Figure 2 is a vertical, transverse section of the same taken on line 2—2, Fig. 1.

Figure 3 is a horizontal section taken on line 3—3, Fig. 2.

Figure 4 is a view similar to Fig. 1, but showing a different means of producing a contrast in the mirror reflecting area and the time piece supporting area or section of the glass mirror plate.

Figure 5 is a vertical section taken on line 5—5, Fig. 4.

Figure 6 is a front elevation showing my invention embodied in a combined mirror and time piece in which the mirror is of oblong form and the time piece is mounted at one end thereof.

Figure 7 is a horizontal section taken on line 7—7, Fig. 6.

Figure 8 is a vertical section taken on line 8—8, Fig. 6.

Figure 9 is a front elevation of the mirror showing different means of producing the contrasting effect between the reflecting portion of the glass mirror plate and the non-reflecting portion in the rear of which the time piece is mounted.

Figure 10 is a fragmentary, horizontal section taken on the correspondingly numbered line in Fig. 9.

Figure 11 is a vertical, transverse section taken on the correspondingly numbered line in Fig. 9.

Figures 12, 13, 14, 15 and 16 are longitudinal sections showing the successive steps of one of the methods of producing reflecting, non-reflecting, and clear areas on a transparent plate in accordance with my invention.

Figure 17 is a rear elevation of a transparent plate finished in accordance with this method.

In the following description similar characters of reference indicate like parts in the several figures.

Referring to Figs. 1, 2 and 3, the numeral 20 represents the transparent plate of the mirror and time piece support, which plate is preferably made of glass although any other suitable transparent material will answer the purpose. This plate in this instance is made of substantially triangular form with the corners rounded and two of the corners are arranged horizontally in line with each other while the third corner is arranged centrally between the end corners and projects upwardly. The lower section of the glass plate which extends from one of the lower corners to the other is provided on its rear side with a mirror coating 21, such as silvering, so that a horizontally elongated mirror or reflecting area is formed on this portion of the glass plate which will serve as a rear view mirror and enable an occupant of the car upon looking into the same to observe the condition of the roadway in rear of the car. The upper portion of the glass plate above the mirror coated area thereof is provided centrally with a clear or uncoated area 22 behind which a time piece such as a watch or clock 23 is mounted and capable of being read or observed from the front of the mirror plate. The adjacent portion of the mirror plate above the reflecting area and surrounding the uncoated or clear area of the same is treated in a manner which will not only render the same non-reflectent but also of a contrasting tone as compared with the tone of the reflecting portion of the mirror plate and thereby enable the eye of the passenger to clearly and easily select either the mirror for rear vision purposes or the time piece for ascertaining the time of the day without experiencing any inconvenience or confusion.

The means whereby this is accomplished in the construction shown in Figs. 1–3 consist in removing by sand blasting that part of the rear side of the glass plate immediately above the reflecting or mirror surface and surrounding the clear or uncoated area so that this sand blasted area recedes from the rear surface of the glass plate, as shown at 24, and forms a rearwardly projecting dowel or raised portion 25 on the uncoated or clear portion 22 of the glass plate, as shown in Figs. 2 and 3. This sand blasted surface or area is provided with a coat of any suitable opaque material which will render the same non-transparent but still of a contrasting tone or color as compared with that produced by the mirror coating 21. For this opaque material any suitable paint, lacquer, bronze or the like of the desired color may be employed. When this opaque coating is applied to the transparent plate above the reflecting surface and around the clear transparent portion thereof an appearance of the clear glass area is produced which resembles that of being embossed or off-set and is very attractive.

Various means may be employed for holding the time piece in its proper position on the rear side of the mirror plate and also supporting this plate and the time piece on the windshield of a car or other desired place which is intended to be used for this purpose, but the means for thus mounting the time piece on the mirror plate and also supporting this plate and the time piece on the windshield which are shown in Figs. 1, 2 and 3 are constructed as follows:

The numeral 27 represents a cup-shaped casing having a rear head 28 which engages with the rear side of the time piece through the medium of a felt washer 29 and a forwardly projecting annular flange 30 which surrounds the periphery of the time piece and has its front edge surrounding the dowel or raised clear portion of the glass plate and bearing against the depressed non-transparent portion of the glass plate, as shown in Figs. 2 and 3. Between the front side of the watch case and the rear side of the transparent area 22 of the glass plate is arranged a spacer or reflector 31 which preferably has the form of a ring. Winding of the watch is effected through a stem which extends downwardly through a sleeve 32 on the under side of the watch case and terminates at its lower end in a thumb piece 33, said sleeve passing through a notch 34 in the lower part of the supporting casing 27.

The means for retaining this casing and the watch therein in the proper position relative to the rear side of the glass plate comprise upper and lower clamping plates 35 and 36 arranged respectively in rear of the upper and lower parts of the glass plate and provided with hooks 37 and 38 which engage with the upper and lower edges of the glass plate and are held thereagainst by means of bolts 39 which connect corresponding lugs 40, 41, projecting rearwardly from the opposing inner ends of the clamping plates 35 and 36, as shown in Fig. 2. The upper plate 35 is provided with an opening which receives the annular flange 30 of the supporting casing 27 and around this opening the clamping plate 35 is provided with a rearwardly projecting annular flange 42 which is secured to the annular flange of the supporting casing 27 by means of screws 43, as shown in Fig. 3.

A supporting arm or hanger 44 is adapted to be secured to a windshield of an automobile in any suitable manner and at its free end this hanger is provided with a ball 45 which is engaged on opposite sides by sockets 46, 47, on the lugs 40, 41, thereby forming a universal joint or connection between the hanger 44 and the clamping plates 35, 36, so that as a whole this support for the mirror and watch forms a bracket which permits the mirror and the watch to be adjusted into any desired angular position as best suits the needs of the driver or the person for whose use the mirror and time piece are intended.

Obviously the particular shape of the mirror and the character of the contrasting colors or tones between the area of the watch supporting section and the mirror coated section of the plate may be varied widely to suit different tastes and requirements and also for varying the design in order to meet the demands in the trade.

In the construction shown in Figs. 4 and 5 only an annular groove 48 is formed on the upper part of the rear side of the transparent mirror plate which is engaged by the front edge of the annular wall 30 of the watch supporting housing or casing 27 and the adjacent opaque surface 49 on the rear side of the mirror plate around this housing is left at the same height or flush with the clear or transparent portion 22 of the glass plate. This elevated surface 49 may be also subjected to the action of a sand blast and then coated with paint, lacquer, bronze or the like of any suitable color so as to leave a contrast between the mirror or reflecting portion of the glass plate and the opaque portion surrounding the clear field or area 22 of the same, which opaque area produces a grained, stippled or dotted effect or background similar to that which is produced in the construction shown in Figs. 1, 2 and 3, and also gives the impression of embossing or off-setting the mirror from the opaque background which is finished in this manner.

If desired, the rear side of the glass plate may be provided with a score or groove 50 between the reflecting coating 21 and the non-reflecting coating 26, as shown in Fig. 5, thereby forming a defined line between these two areas, on viewing the glass plate from the front, as shown in Fig. 4.

As shown in the construction in Figs. 6, 7 and 8, the glass plate 51 is of rectangular form and elongated horizontally and provided on the left end of its rear side with a reflecting coating 52 such as silver, while its right end is provided with a clear or uncoated area 53 which preferably has the form of a rearwardly projecting dowel which is produced by subjecting the surrounding part of the rear side of the glass plate to the action of a sand blast so that this sand blasted area is lowered or depressed as shown at 54, after which this surface is provided with an opaque coating 55 of any suitable character which will produce a contrast in tone or color between this opaque area and the reflecting or mirror area of the glass plate. This coating as previously stated, may consist of any suitable paint, lacquer or bronze and when applied to the sand blasted surface will produce a stippled, grained or pebbled effect which is very pleasing and enables the eye to readily distinguish at a glance between the mirror portion of the glass plate and the clear portion 53 thereof, behind which a time piece 56 of any suitable character is mounted. In the example shown in Figs. 6, 7 and 8 this time piece is held in place on the rear of the glass plate by means of a cup-like housing or shell 57 which encloses the watch case and surrounds the transparent or clear dowel 53 of the glass plate and is held in an assembled position with reference to the latter by means of upper and lower clips 58, each of which is provided with a front claw 59 engaging over the adjacent edge portion of the glass plate and a rear claw 60 engaging with a shoulder 61 on the adjacent portion of the housing 57, and a clamping screw 62 connecting each clip with the adjacent part of the housing, as shown in Figs. 6 and 8. The winding stem 63 of the watch in this last mentioned construction projects from the watch casing laterally outward through a notch 64 in the housing and is provided with a thumb piece 65 at its outer end for turning the same.

Instead of depressing the opaque area of the oblong glass plate the same may be left at the same height as the clear area 53 and the reflectant area 52 and an annular groove 66 may be formed on the rear side of the plate around the clear area 53 in which the front edge of the cup-shaped housing 57 may be held, as shown in Fig. 10, by any suitable means.

If desired, the reflecting area 52 and the non-reflecting area 55 on the plate 51 may be sharply separated from each other by means of a vertical groove 67 formed in the rear side of this plate, as shown in Figs. 9 and 10, thereby aiding the eye in separating the mirror area from the watch area when it is desired to use either one of them and thus avoid confusion as well as rendering the use of this device more agreeable.

Although the clear or transparent areas of the glass plates through which the watch, clock or time piece is visible from the front side thereof are of round form in Figs. 1, 4, 6 and 9 of the drawings, such clear sections or areas may be of any desired shape or size and depth to suit the particular watch or clock which is intended to be associated with the mirror. For example, this clear area through which the dial of the watch or clock is exposed may be either round, a true square, a square with corners cut off, a hexagon, an octagon, or any other desired contour which will produce a harmonious whole.

In the preparation of the mirror plate the entire rear surface of the same is first coated with the reflecting material, then an area corresponding to the proposed non-reflecting area and clear area is removed, then the clear area is temporarily covered by a protecting coating or sheet of paper, and then the non-reflecting area is sand blasted and left as it is, or coated with paint of a color contrasting with the reflecting surface.

Instead of first coating the entire rear side of the plate with reflecting material and then removing that part of the same corresponding to the non-reflecting and clear areas, the clear area coated with reflectant material may be first covered by a protecting sheet or the like, then the intended non-reflecting area may be sand blasted to remove the reflecting coating and abrade this surface, then the latter may be painted, if desired, to contrast more effectively with the reflecting surface, and then the protecting sheet and the reflecting material is removed from the intended clear area.

Although sand blasting has been referred to as a suitable method of treating the non-reflecting area of the transparent plate and then coating the same with paint, lacquer or bronze for differentiating the character tone, or color of the same from the reflectant and clear areas of the transparent plate, this may be accomplished in various other ways. For example, the non-reflectant area may be produced by merely sand blasting the respective part of the rear side of the transparent plate, or the same may be etched by acid, or the same may be left clear but covered by a sheet of paper or the like of appropriate color.

The rear side of the transparent plate may also be treated without the use of sand blasting or etching which has an abrasive or destructive action on the same and still accomplish the purpose of this invention, this particular method and the product resulting from the same being as follows:—

Referring to Figs. 12—17, the numeral 68 represents a transparent plate of glass which is first prepared so that its front and rear sides are smooth, as shown in Fig. 12. The rear side of this plate is provided with a reflecting coating such as silver, gold or the like, which may extend over the entire rear side of the plate, as shown at 69 in Fig. 13, and may then be partly removed to provide a clear area 70 on one part of the rear side of the plate, and a reflecting area 71 on another part thereof, as shown in Fig. 14, or the reflecting coating may be applied initially over only that part of the rear side of the plate, shown at 71 in Fig. 14, and while the area 70 is left clear and uncoated.

A comparatively thick non-reflecting coat 72 of paint, lacquer, bronze or the like is now applied to the clear rear area 70 of the glass plate which coat preferably is also extended over the back of the adjacent reflecting coating 71 so as to form a protecting backing for the same, as shown in Fig. 15, the section 72 of this non-reflecting coating being of a tone or color which contrasts with the tone or color of the reflecting coating 71 and enables the eye to readily discern a sharp line of demarcation between the same, similar to that illustrated in Figs. 1, 4, 6 and 9.

The central part of the section 72 of non-reflecting coating or paint is now removed from the rear side of the glass plate by a suitable cutter or scraper so as to leave a clear area 74 which latter may be of any desired contour, for example round, as shown in Figs. 16 and 17.

Behind this clear area the instrument such as a watch or clock may be mounted so that its dial is visible from the front of the plate, said instrument being supported within a housing or shell 75, the front edge of which may fit the margin of the clear area 74 of the glass plate, as shown in Fig. 16, and be supported as a unit with the plate in any approved manner.

I claim as my invention:

1. A transparent panel having a portion through which the face of an instrument is adapted to be displayed and an image reflective coating provided on a substantial part of the surface of said panel and a substantial area of the surface of said panel around said portion and between said portion and said image reflective coating being provided with a dimmed image-reflective finish whereby the face of the instrument is more easily discerned through said portion.

2. A transparent panel having a portion through which the face of an instrument is adapted to be displayed, an image reflective coating provided on said panel to one side of the said portion, and a dimmed image-reflective coating provided on said panel around said portion and between said portion and said image reflective coating whereby the instrument face is more easily discerned through said portion.

3. A transparent panel having a portion through which the face of an instrument is adapted to be displayed, an image reflective coating provided on said panel to one side of the said portion, and a dimmed image-reflective coating provided on said panel around said portion and between said portion and said image reflective coating whereby the instrument face is more easily discerned through said portion, said portion and coatings extending over substantially the entire surface of said panel.

4. A transparent panel having a portion through which the face of an instrument is adapted to be displayed and an image reflective coating provided on a substantial part of the surface of said panel and a substantial area of the surface of said panel around said portion and between said portion and said image reflective coating being sand blasted to render it dimmed image-reflecting whereby the face of the instrument is more easily discerned through said portion.

5. A transparent panel having a portion through which the face of an instrument is adapted to be displayed, an image reflective coating provided on a substantial part of the surface of said panel and a substantial area of the surface of said panel around said portion and between said portion and said image reflective coating being sand blasted to render it dimmed image-reflecting whereby the face of the instrument is more easily discerned through said portion and an opaque coating applied to said sand blasted area.

6. A transparent panel having a portion through which the face of an instrument is adapted to be displayed, an image reflective coating provided on said panel to one side of the said portion, and a dimmed image-reflective coating provided on said panel around said portion and between said portion and said image reflective coating whereby the instrument face is more easily discerned through said portion and said panel being also provided with a groove between said image reflective and dimmed image-reflective areas.

In testimony whereof I affix my signature.

WILLIAM LA HODNY.